United States Patent [19]
Itoh et al.

[11] Patent Number: 5,089,196
[45] Date of Patent: Feb. 18, 1992

[54] NON-MAGNETIC SUBSTRATE OF MAGNETIC HEAD, MAGNETIC HEAD AND METHOD FOR PRODUCING SUBSTRATE

[75] Inventors: Eiji Itoh; Ryuichi Nagase; Kazuhiro Saito, all of Urawa; Hiroshi Hosaka; Hihumi Nagai, both of Toda, all of Japan

[73] Assignee: Nippon Mining Co., Ltd., Tokyo, Japan

[21] Appl. No.: 684,073

[22] Filed: Apr. 12, 1991

[30] Foreign Application Priority Data

| | | | |
|---|---|---|---|
| Feb. 25, 1988 | [JP] | Japan | 63-43028 |
| Sep. 30, 1988 | [JP] | Japan | 63-243995 |
| Sep. 30, 1988 | [JP] | Japan | 63-243996 |
| Sep. 30, 1988 | [JP] | Japan | 63-243997 |

[51] Int. Cl.$^5$ .............................................. C04B 35/32
[52] U.S. Cl. ..................................... 264/65; 264/325; 264/332
[58] Field of Search .......................... 264/65, 325, 332

[56] References Cited
U.S. PATENT DOCUMENTS

| | | | |
|---|---|---|---|
| 4,540,638 | 9/1985 | Sukakihara | 428/693 |
| 4,719,148 | 1/1988 | Stoppels | 428/336 |

FOREIGN PATENT DOCUMENTS

| | | |
|---|---|---|
| 52-107598 | 9/1977 | Japan . |
| 59-908 | 1/1984 | Japan . |
| 59-172703 | 5/1984 | Japan . |
| 60-55470 | 12/1985 | Japan . |
| 61-29907 | 7/1986 | Japan . |
| 61-192006 | 8/1986 | Japan . |
| 63-157407 | 6/1988 | Japan . |
| 63-168007 | 7/1988 | Japan . |

Primary Examiner—James Derrington
Attorney, Agent, or Firm—Armstrong, Nikaido, Marmelstein, Kubovcik, & Murray

[57] ABSTRACT

A non-magnetic substrate used for a magnetic head comprising a pair of non-magnetic substrates, and a magnetic layer structure sandwiched between the pair of non-magnetic substrates. The magnetic layer structure is comprised of alternately laminated magnetic layers and intermediate insulating layers. The invention discloses for the substrate material a composition expressed by $Zn_xM_yCo_{2-x-y}O_2$, with the proviso that M is Mn or Ni, $0 \leq x \leq 0.4$, $0.4 \leq y \leq 1.0$, $0.8 \leq x+y \leq 1.0$, or $Co_xNi_{2-x}O_2$, with the proviso that $0.2 \leq x \leq 1.8$, and having a rock-salt structure.

4 Claims, 4 Drawing Sheets

NON-MAGNETIC SUBSTRATE OF MAGNETIC HEAD, MAGNETIC HEAD AND METHOD FOR PRODUCING SUBSTRATE

This is a division, of application Ser. No. 314,738 filed Feb. 24, 1989 now U.S. Pat. No. 5,026,614.

BACKGROUND OF INVENTION

1. Field of Invention

The present invention relates to a non-magnetic substrate of a magnetic head, for vapor-depositing a metallic magnetic layer thereon. The present invention also relates to a magnetic head, in which the above mentioned substrate is used. The non-magnetic substrate according to the present invention is suited for producing magnetic heads, in which thin layers of Fe-Si-Al alloy are used. Such magnetic heads are appropriate for use at a high frequency and as high density-recording heads, such as video-heads and digital heads, in which a high S/N ratio is required. The present invention also relates to the method of producing the non-magnetic substrate of magnetic heads.

2. Description of Related Arts

Figure 1:
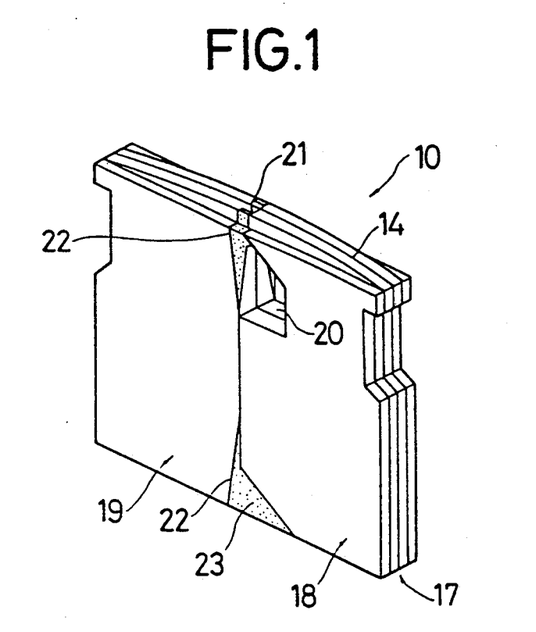
FIG. 1 is an elevational view of a thin-film laminate type-magnetic head.
Figure 2:
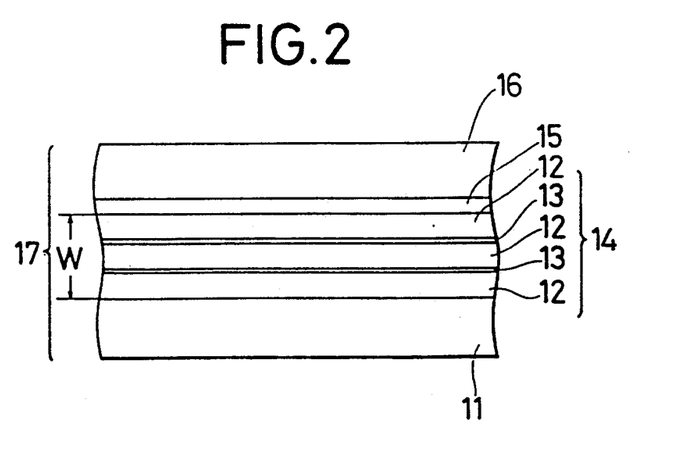
FIG. 2 is a partial cross sectional front view of the layers of the magnetic head.

The recent increase of recording density in the field of magnetic recording technique is outstanding. Along with this, not only are magnetic heads, which are an example of electro-magnetic transducers, required to provide an increasingly narrower track width, but also the core material of magnetic heads is required to have increasingly higher levels of saturation magnetization and permeability in a high frequency region. An example of the magnetic heads is illustrated in FIGS. 1 and 2. Its structure is briefly described below.

Referring to FIG. 2, the substrate 11 consists of non-magnetic material, e.g., $SiO_2$-$Li_2O$-$Al_2O_3$ series crystalline glass. Fe-Si-Al alloy is formed on the substrate 11 as a magnetic alloy layer 12 having a thickness of from 1 to 20 μm. On the magnetic alloy layer 12 a non-magnetic insulating layer consisting of $SiO_2$ is then formed as the intermediate insulating layer 13 having a thickness of from 0.03 to 0.5 μm.

The magnetic alloy layers 12 and the intermediate insulating layers 13 are laminated onto each other until a requisite number of layers is obtained. Thickness and numbers of the magnetic alloy layers 12 and intermediate insulating layers 13 are appropriately determined to provide a magnetic layer-structure 14 having the track width w (FIG. 2).

A glass layer 15 is formed on the magnetic layer-structure 14, and the other non-magnetic substrate 16 is laminated on the glass film 15. $SiO_2$-$B_2O_3$-$ZnO$ series bonding glass is used for the glass film. The non-magnetic substrate 16 is produced with the use of the same material as in the above mentioned substrate 11.

A laminate-layer structure 17 produced as described above is then cut through the laminate structure. A pair of blocks, i.e., core halves 18, 19 are thus produced. A groove(s) for winding 20 is formed on at least one of the core halves 18, 19, i.e., the core half 18 in the present example.

In order to strengthen the bonding of abutting surfaces of the both core half blocks 18 and 19, chamfers 22 are formed. In the present example, the chamfers 22 are formed on the core half 19 at top and bottom of the abutting side, one of which is opposite winding groove 20. A recess 23 is formed on core half 18 on the abutting side opposite groove 20. The abutting surfaces of both core halves 18, 19 are then polished, and subsequently a non-magnetic gap-spacer 21 consisting of $SiO_2$ is formed between both core halves.

Both core halves 18 and 19 are then abutted at the abutting surfaces. $PbO$-$B_2O_3$ series molding glass is then filled in chamfers 22 and recess 23 to bond the core halves 18 and 19.

Both core halves 18 and 19 are finally subjected to forming, such as polishing to form a rounded surface, on which the tape will slide. A wire is then wound around the core halves to complete the production of a magnetic head 10.

During the production of magnetic head 10, the magnetic alloy layers consisting of Fe-Si-Al series alloy are deposited on the non-magnetic substrate to a thickness of from a few μm to several tens of μm by means of the known physical vapor deposition methods, such as the vacuum deposition, sputtering, ion plating, and the like. The magnetic alloy layers are then heat treated at 500° to 700° C. under vacuum to improve the magnetic properties. Fe-Si-Al series alloy is usually referred to as Sendust. The Fe-Si-Al series alloy herein also includes various modified compositions of Sendust.

Nevertheless, most of the conventionally proposed materials for the substrates 11, 16 exhibit a coefficient of thermal expansion which is greatly different from that of magnetic layer-structure 14, with the result that the vapor-deposited, magnetic layer structure 14 is liable to peel. In addition, due to the difference in the coefficient of thermal expansion, an extremely great tensional or compressional stress is generated in the molding glass filled in the chamfers 22 and the like, with the result that the molding glass occasionally cracks.

Heretofore, such non-magnetic materials as barium titanate, calcium titanate, alumina, zinc ferrite, glass and the like have been proposed for use as the substrates 11, 16. The above mentioned $SiO_2$-$Li_2O$-$Al_2O_3$ series, crystalline glass is alleged to have coefficient of thermal expansion ($=120 \times 10^{-7}$/°C.) which is the closest among the proposed non-magnetic materials to that of magnetic layer structure 14. Notwithstanding the use of such glass, the above described problems could not be solved completely.

Since the glass materials have low levels of hardness, when they are used for the non-magnetic substrates 11, 16, the hardness and wear-resistance of substrates 11, 16 are different from those of the magnetic layer-structure 14. When a magnetic tape used is one having a high coercive force, such as metal tape, problems in distortional wear take place due to the friction between the magnetic tape and substrates 11, 16 as well as the friction between the magnetic tape and magnetic layer-structure 14. As a result, the magnetic properties of a magnetic head are disadvantageously changed. Particular problems when crystalline glass is used for the non-magnetic substrates exist in that: their wear speed is too high, shortening the life of the magnetic head; due to the brittleness of the crystalline glass, the non-magnetic substrates, on which layers having a thickness of several tens of $\mu$m are formed, may disadvantageously be deformed and then crack due to the stress of the layers, or the magnetic layer-structure may disadvantageously peel at its boundary with the non-magnetic substrates. It is therefore necessary to select, for the non-magnetic substrates, materials such that: their coefficient of thermal expansion ($\alpha$) is close to that of the magnetic alloy layer of Fe-Si-Al alloy ($120-150 \times 10^{-7}$/°C.); their hardness property is comparable to the hardness of the magnetic powders contained in a magnetic tape (Hv 500-700); and, no chemical erosion reactions take place between the non-magnetic substrates and the other constituent members of the magnetic head.

Conventional methods of producing non-magnetic substrates involve the fundamental steps (1) blending of starting material powders, (2) presintering and crushing of blended powders, (3) shaping, and (4) sintering. The conventional methods are detrimental however, in that the crack-generating ratio of sintered bodies is high; and, high densification is difficult. Specific methods for preventing cracks in sintered bodies, are proposed in Japanese Examined Patent Publication No. 53-47162, which describes the provision of a shaping apparatus of sintered bodies, Japanese Examined Patent Publication No. 61-29907, which describes heating or heating and pressing with the addition of resin, and Japanese Examined Patent Publication No. 60-55470 which describes polishing and removing the surface of sintered bodies, followed by HIP (hot isostatic pressing) treatment. CIP (cold isostatic pressing) seems to be suitable for the shaping method. However, most of patents disclosing CIP are related to apparatuses and dies (for example, Japanese Unexamined Patent Publication No. 62-212099).

Regarding densification, it is common in the field of ferrite to carry out sintering under normal pressure and then HIP (c.f., e.g. Japanese Unexamined Patent Publication No. 63-157407). There is also a disclosure in Japanese Unexamined Patent Publication No. 63-168007 wherein the surface of a sintered body is enveloped with the ferrite powder and is subjected to HIP treatment.

SUMMARY OF THE INVENTION

A principal object of the present invention is to provide a non-magnetic substrate which: exhibits a coefficient of thermal expansion not greatly different from that of the magnetic alloy layer; exhibits properties suitable for forming thereon a magnetic alloy layer by any physical deposition method; and exhibits a high level of hardness and wear resistance required for the magnetic head.

Another object of the present invention is to provide a magnetic head which is produced with the use of non-magnetic substrates and magnetic alloy layers consisting of Fe-Si-Al alloy, wherein: the non-magnetic substrates exhibit a coefficient of thermal expansion not greatly different from that of the magnetic layer structure which consists of magnetic alloy layers and non-magnetic spacers; the vapor-deposited, magnetic layer structure is difficult to peel; the generation of cracks in the molding glass and the like, due to the difference in coefficients of thermal expansion as mentioned above, is not liable to occur; and, neither cracks in the non-magnetic substrates nor peel of magnetic alloy layers from such substrates occur even if layers as thick as several tens of $\mu$m are formed.

A specific object of the present invention is to provide a non-magnetic substrate, which consists of material whose coefficient of thermal expansion is in the range of 120 to $150 \times 10^{-7}$/°C., whose Vickers Hardness is from 500 to 700, and any chemical erosion reaction between said material and the materials of other constituent members of a magnetic head is not extreme.

The present inventors examined various materials for non-magnetic substrates in order to attain the objects as described above. As a result, to use as a non-magnetic substrate, on which magnetic alloy layers are physically deposited, they discovered $Zn_xM_yCo_{2-x-y}O_2$ (with the proviso that M is Mn or Ni, $0 \leq x \leq 0.4$, $0.4 \leq y \leq 1.0$, and, $0.8 \leq x+y \leq 1.0$), which has a rock-salt structure. It is possible with the use of a plurality of the substrates to produce a magnetic head having a high level of hardness, high wear-resistance and high quality.

In addition, another object of the present invention is to provide a sintering method which prevents cracking in a sintered body, $Zn_xM_yCo_{2-x-y}O_2$, and to provide a sintered body having a high density.

The material of a non-magnetic substrate, according to the present invention on which magnetic alloy layers consisting of Fe-Si-Al alloy are physically deposited, is $Zn_xM_yCo_{2-x-y}O_2$ (with the proviso that M is Mn or Ni, $0 \leq x \leq 0.4$, $0.4 \leq y \leq 1.0$, and, $0.8 \leq x+y \leq 1.0$) having a rock-salt structure.

According to another embodiment of the present invention, a magnetic head, is provided in which between both non-magnetic substrates is sandwiched a magnetic layer structure which consists of alternately: laminated layers which comprise magnetic alloy layer, and an intermediate insulating layer, characterized by the respective non-magnetic substrates which are expressed by $Zn_xM_yCo_{2-x-y}O_2$ (with the proviso that M is Mn or Ni, $0 \leq x \leq 0.4$, $0.4 \leq y \leq 1.0$, and, $0.8 \leq x+y \leq 1.0$) which has a rock-salt structure.

According to the results of researches and experiments by the present inventors it was revealed that, within the compositional range of $0 \leq x \leq 0.4$, $0.4 \leq y \leq 1.0$, and, $0.8 \leq x+y \leq 1.0$ of the non-magnetic oxide material which is expressed by $Zn_xM_yCo_{2-x-y}O_2$, the coefficient of thermal expansion ($\alpha$) of such material is approximately 120 to $140 \times 10^{-7}$/°C. and hence approximately the same as the coefficient of thermal expansion of the magnetic alloy layer consisting of Fe-Si-Al alloy.

The above described material of non-magnetic substrate has the fundamental composition of 2 moles of metallic elements, i.e., Zn, Mn or Ni and Co relative to 2 moles of oxygen and rock-salt structure. When the molar ratio of metallic elements to oxygen greatly deviate from 2:2, the fundamental crystal structure of oxide becomes mixed phases of the rock-salt type and other type(s). One particular reason in the deviation of molar ratio is the occurrence of oxidation during sintering. For example, with regard to Mn, oxidation of MnO used as the starting material yields $Mn_3O_4$, $Mn_2O_3$ and the like, with the result that the above described thermal expansion property may be occasionally lost. Such oxidation of a metallic element can be prevented by combination with the other elements. In this regard, the present inventors discovered that fundamental components of Mn-Co-O, Ni-Co-O, Zn-Mn-Co-O, and Zn-Ni-Co-O series easily form a stable salt-rock structure.

It turned out that the oxide having a composition of $Zn_xM_yCo_{2-x-y}O_2$ (with the proviso of M being Mn or Ni, $0 \leq x \leq 0.4$, $0.4 \leq y \leq 0.8$, and $0.8 \leq x+y \leq 1.0$) is difficult to sinter and to control the composition because of high vapor pressure of ZnO, and, further, the vapor contaminates the furnace interior. The present inventors therefore studied the properties of an oxide having the composition of $Co_xNi_{2-x}O_2$ with the proviso of $0.2 \leq x \leq 1.8$.

Figure 3:
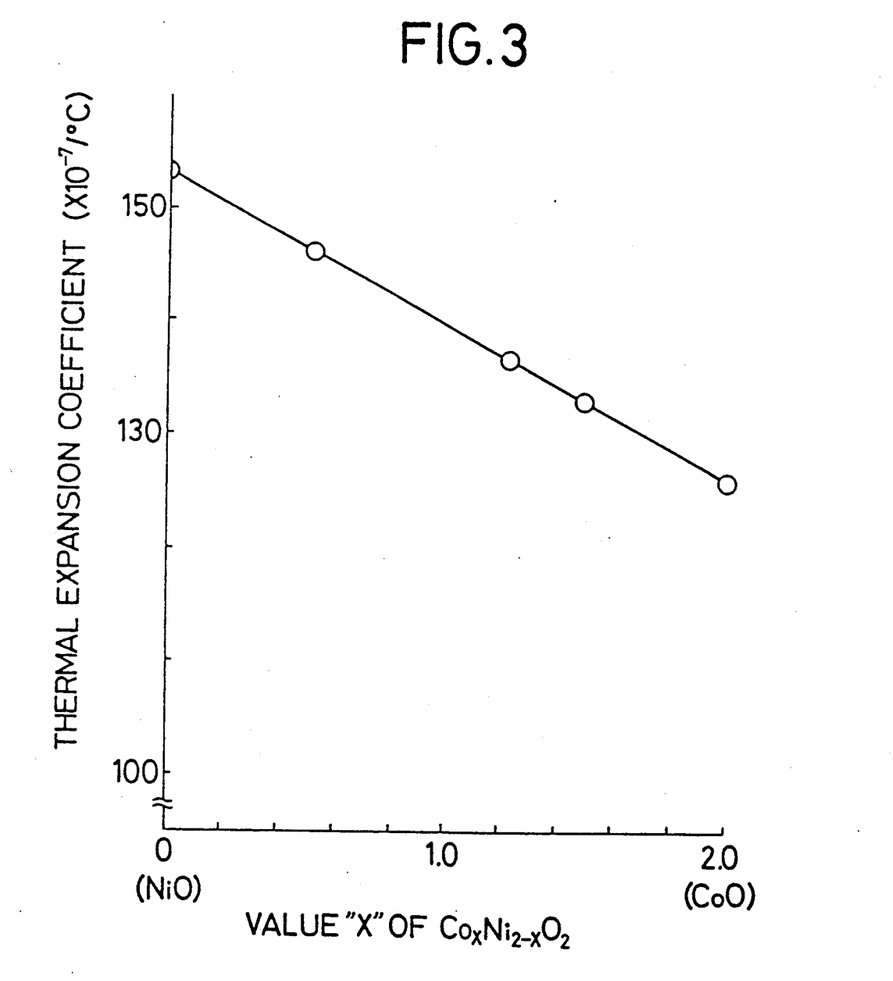
FIG. 3 is a graph showing the thermal expansion coefficient of sintered CoO-NiO mixture at a temperature of 100°–400° C.

Referring to FIG. 3, the coefficient of thermal expansion of a binary mixture of CoO and NiO at a temperature of from 100° to 400° C. is shown. It is apparent from FIG. 3 that the coefficient of thermal expansion is easily adjusted. It was thus discovered that the above described compositional range is desirable for the substrate of a magnetic head. A dense $Co_xNi_{2-x}O_2$ sintered body having a rock-salt structure is obtained by using CoO and NiO as the starting materials, and applying ordinary of powder metallurgy technique. A body sintered in such a way has a level of hardness higher than the conventional ones. It was confirmed that, when a thus sintered body was slid against a magnetic tape, the wear and breakage at the edges due to the sliding against a magnetic tape was slight, and, hence such a sintered body was found superior to the conventional materials.

MnO, $TiO_2$, $Al_2O_3$ or CaO are additives added to the above mentioned fundamental $Zn_xM_yCo_{2-x-y}O_2$ and $Co_xNi_{2-x}O_2$. They appreciably enhance density and hardness at the additive quantity of from 0.1 to 5 wt %. MnO is effective for promoting sintering and has a coefficient of thermal expansion nearly the same as that of CoO. When, however, MnO is added at a ratio greater than 5 wt %, MnO precipitates in the grain boundaries of particles of a sintered body, which becomes a ground for reducing the hardness.

$TiO_2$ is much harder than CoO and NiO. Hardness enhancement is therefore expected by the addition of $TiO_2$. The coefficient of thermal expansion of $TiO_2$ is however lower than the NiO, CoO or MnO. Addition of $TiO_2$ at a ratio of more than 5 wt % therefore leads to a detrimental influence upon the coefficient of thermal expansion.

$Al_2O_3$ is effective for suppressing the growth of crystal grains. Hardness enhancement by the addition of $Al_2O_3$ is therefore expected. However, since $Al_2O_3$ forms with CoO and NiO a spinel which renders the substrate too hard, the addition of $Al_2O_3$ at a ratio greater than 5 wt % is not preferred. The coefficient of thermal expansion of $Al_2O_3$ is comparable to that of $TiO_2$. For this reason also, the addition of 5% or less is preferred.

CaO has as high a level of hardness as $TiO_2$ has, and is therefore expected to enhance the hardness. However, the coefficient of thermal expansion of CaO is lower than that of NiO and CoO, and, therefore the addition of CaO at a ratio of 5% or less is preferred.

The additives may be used alone or in combination with each other. Desirably, the additives are combined to attain the desired hardness and coefficient of thermal expansion.

By using additive(s), such as MnO and the like, the hardness of a substrate can be enhanced. As a result, the short life of a magnetic head, as well as deformation, cracks, and the like of a non-magnetic substrate, which are frequently seen in the case of a non-magnetic substrate, having a low level of hardness, can be prevented. A non-magnetic substrate with such an additive(s) is particularly advantageous as regards the wear-resistance and durability of a magnetic head.

Figure 5:
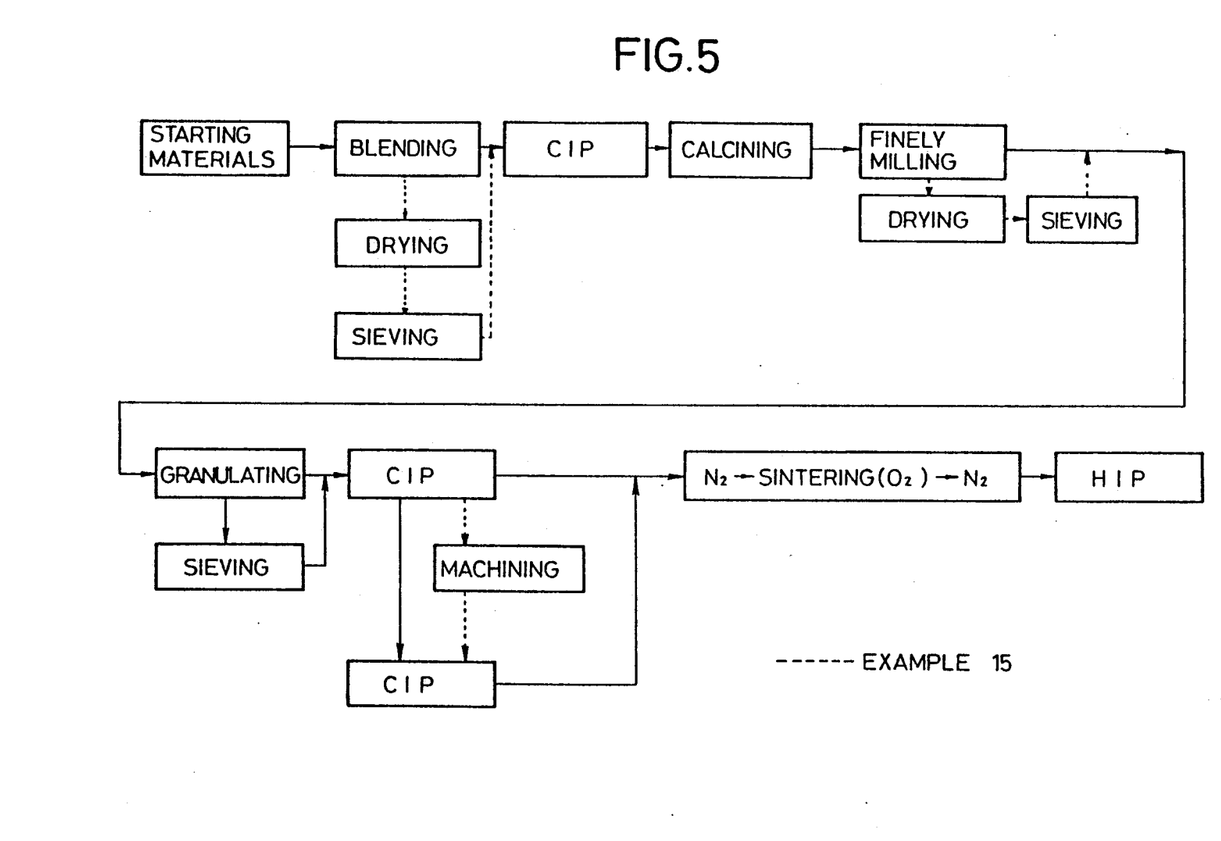
FIG. 5 is a flow chart of methods according to the present invention.

A preferable method (1) for producing a non-magnetic substrate used for a magnetic head consists, as shown in the solid lines of FIG. 5, of: a blending step for blending and then screening the starting materials; a calcining step for calcining the blended powder which has been CIP shaped, crushing and then screening; a finely-dividing step for crushing the calcined powder to 1 μm or less; a granulating step for granulating the finely divided powder to a spherical shape 20 μm or more in size; a shaping step for shaping the granulated powder by CIP; a sintering step of the shaped powder; and an HIP step of the sintered body. Another preferable method (2) carries out the sintering according to method (1) at a temperature of 1000° C. or more in an oxygen atmosphere, under normal pressure or high pressure in the hot press method. A third preferable method (3) carries out the HIP according to method (1) in such a manner that the sintered body is subjected, as it is, to HIP at a temperature lower than the sintering temperature. A fourth preferable method (4) comprises: a step for CIP treatment of the preliminarily CIP treated powder in the method (1), wherein the ceramic powder is disposed around the preliminarily CIP treated article and then the second treatment is carried out. These methods are hereinafter specifically described.

(1) Blending step for blending and then screening the starting material powder.

Commercially available cobalt oxide and nickel oxide are used to provide a desired composition of $Co_xNi_{2-x}O_2$ with the proviso of $0.2 \leq x \leq 1.8$ or $Zn_xM_yCo_{2-x-y}O_2$ (with the proviso of M being Mn or Ni, $0 \leq x \leq 0.4$, $0.4 \leq y \leq 0.8$, and $0.8 \leq x+y \leq 1.0$). Blending by a ball mill is carried out. To minimize contamination by the mill material, the mill material is preferably alumina. The blending medium used is an organic solvent such as alcohol or the like or water. The blending time ranges from 5 to 40 hours, ideally 20 hours. After withdrawal from the mill, drying and, if necessary, screening are carried out. The screen ranges from 150 to 300 μm, preferably from 200 to 300 μm.

(2) Calcination step for calcining, crushing and then screening the CIP shaped powder-mixture.

In order to obtain a more uniform calcined powder, the powder mixture is CIP shaped and then calcined in this step. The shaping pressure is desirably from 1000 to 1500 kg/cm². The calcination condition is 700°–1200° C. for 1–6 hours, ideally 850°–950° C. for 4–6 hours. The calcination is carried out under an inert atmosphere, such as argon, $N_2$ or the like. Oxide having a rock-salt structure is obtained as a result of calcination. After sintering the oxide is slowly cooled down to room temperature and is then crushed by means of a rough crusher, preferably a vibration mill. After crushing, the screening is carried out by means of a screen 100 to 300 μm, desirably 100 to 200 μm in size, thereby enhancing the efficiency of subsequent finely milling.

(3) Finely milling step of the calcined powder to 1 μm or less.

A wet ball mill as described in (1) is used for finely milling. The time required is from 20 to 72 hours. In addition, in order to enhance the effects of finely milling, it is desirable to carry out the ball milling several times, decreasing the diameter of the balls each time. After withdrawal from the ball mill, drying is carried out. A slurry is then obtained by water-addition. A slurry concentration should be high, preferably between 300 to 500 g/l.

(4) Granulating step for granulating the finely milled powder into a spherical shape 20 μm or more in size.

Ideally, the granulating apparatus should be a spray drier. Granulation to obtain a spherical shape of 20 μm or more, ideally 50 to 60 μm, is carried out while selecting the conditions in accordance with the apparatus characteristics. The screening is carried out after the granulation, so as to exclude contaminated and gigantic particles, which come from the granulation apparatus, and to obtain as narrow a particle distribution as possible. Ideally, the screen is approximately 60 μm.

(5) CIP shaping step of the granulated powder

Preferably, duplicate CIP shaping is carried out as shown in FIG. 5. That is, shaping is first carried out under pressure of 1000 to 1500 kg/cm$^2$. If an article thus shaped is subjected to sintering, although a finished product can be obtained, cracking occurs frequently on the outer surface of the finished product. This necessitates a measure for prevention of cracking. Ceramic powder is therefore filled in around the outer side of the preliminarily CIP shaped body, which becomes the finished product. The second CIP treatment is carried out preferably at a pressure lower than the first CIP pressure, ranging from 500 to 1500 kg/cm$^2$. The ceramic powder may be of the same composition as that of the preliminarily shaped powder, and may be one of the same lot as or different from that of the preliminarily shaped powder being produced. The grain size of the ceramic powder may be different from that of the preliminarily shaped powder. A heterogeneous powder of $Al_2O_3$, $ZrO_2$, $TiO_2$, CaO and the like can be used without incurring any problems. The shaped body which becomes the finished product ideally has a 1 to 1 ratio of diameter to height. After the CIP shaping, the outer peripheral surface of the CIP shaped body is desirably machined partially to minimize unevenness. A 3 to 5 mm thickness of the powder filled at the second CIP step, is satisfactory for preventing cracks in the finished product at sintering.

(6) Sintering step of shaped article

The dual-CIP treated shaped body is sintered. As a result of investigation of the sintering temperature, it was revealed that grain growth is conspicuous at a temperature of 1400° C. or more. Therefore, sintering is preferably carried out at a temperature of 1400° C. or less. Sintering time ranges from 1 to 10 hours, ideally 3 hours. In the light of behaviour of cobalt oxides, desirably, the sintering atmosphere is oxygen atmosphere at a temperature of 1000° C. or higher, and is an inert gas atmosphere, such as $N_2$ atmosphere. Elevating and lowering rates of temperature should be done as slowly as possible, preferably approximately 1° C./minute. The sintering temperature is desirably from 1230° to 1400° C. At a temperature lower than this, density is low and open pores are created, with the result that the subsequent HIP becomes ineffective.

(7) HIP step of sintered body

A sintered body is not encapsulated but is HIP treated as it is. Since the pores are closed at the sintering step, the sintered body need not be encapsulated. The HIP temperature is desirably lower than the sintering temperature. The preferable HIP temperature is from 50° to 100° C. lower than sintering temperature. Pressure ranges from 500 to 2000 kg/cm$^2$ and is desirably from 800 to 1200 kg/cm$^2$. Time ranges from 30 minutes to 3 hours, preferably 40 minutes to 1 hour and 20 minutes. The HIP treated, sintered body is subjected to cutting and polishing of the surfaces to provide a substrate. The $Co_xNi_{2-x}O_2$ or $Zn_xM_yCo_{2-x-y}$ based, non-magnetic substrate produced by the above steps is suitable for a magnetic head, since occurrence of cracks is slight and the density is high.

The present invention is hereinafter described in detail with reference to the examples.

EXAMPLES 1 through 8

The following non-magnetic oxide materials were produced: M is Mn and x=0, y=1 (Example 1); M is Mn and x=0.1, y=0.9 (Example 2); M is Mn and x=0.25, y=0.65 (Example 3); M is Mn and x=0.4, y=0.4 (Example 4); M is Ni and x=0, y=1 (Example 6); M is Ni and x=0.1, y=0.9 (Example 7); and, M is Ni and x=0.4, y=0.4 (Example 8). ZnO, $MnCO_3$, NiO and CoO were weighed to produce 500 g of the above oxides. Blending and crushing were carried out for 10 to 20 hours by means of a ball mill with the use of water or an organic solvent such as alcohol and acetone. $Al_2O_3$ in an amount of 4 wt % was added to the composition of Example 1 and the composition was then subjected to the identical production (Example 5).

The calcination was carried out at 700° to 1200° C. After shaping with metal dies, the sintering was carried out at a temperature of from 1150° to 1300° C.

The materials obtained in Examples 1 through 8 were subjected to X-ray diffraction, which revealed that the structure was NaCl (rock salt) type.

The properties of non-magnetic substrates of the respective examples are shown in Table 1.

TABLE 1

| Examples | x | y | Coefficient of Thermal Expansion (*1) | Permeability (*2) | Vickers Hardness (*3) |
|---|---|---|---|---|---|
| 1 | 0 | 1 | 131 | 1.0002 | 580 |
| 2 | 0.1 | 0.9 | 134 | 1.0002 | 620 |
| 3 | 0.25 | 0.65 | 127 | 1.0002 | 680 |
| 4 | 0.4 | 0.4 | 137 | 1.0002 | 630 |
| 5 | 0 | 1 | 124 | 1.0002 | 650 |
| 6 | 0 | 1 | 131 | 1.0002 | 680 |
| 7 | 0.1 | 0.9 | 124 | 1.0002 | 630 |
| 8 | 0.4 | 0.4 | 127 | 1.0002 | 580 |

Remarks:
(*1) × $10^{-7}$/°C. (0-400° C.);
(*2) at 1 MHz;
(*3) kg/mm$^2$

EXAMPLE 9

Thin-film laminate magnetic heads were produced by using the substrates produced in Examples 1 through 8.

Figure 4:
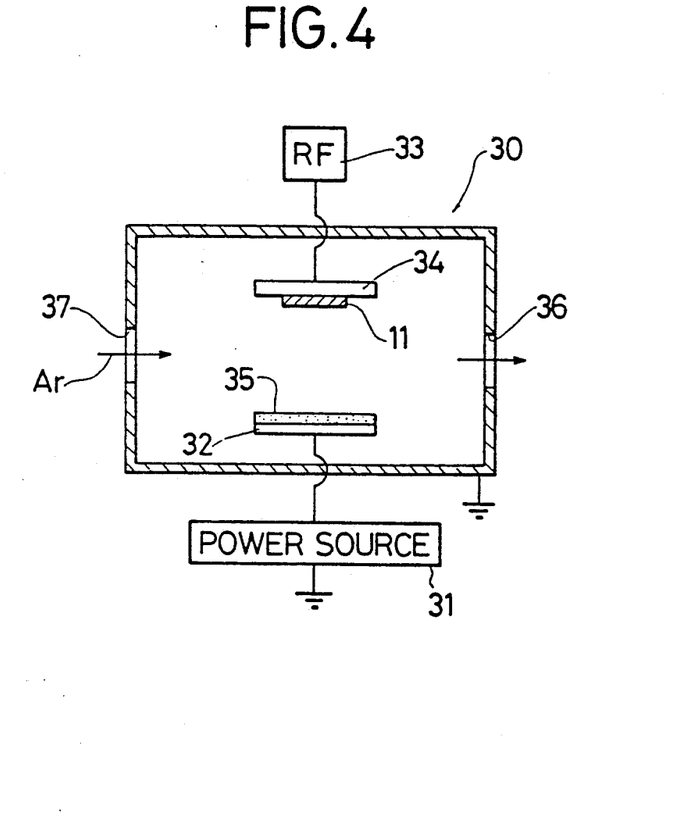
FIG. 4 is a schematic view showing the structure of a sputtering apparatus for producing a thin-film laminate type magnetic head.

The magnetic heads according to the present invention had a structure as shown in FIG. 1 and were produced by means of the DC magnetron sputtering device as schematically shown in FIG. 4 and operated under the application of RF bias.

The DC magnetron sputtering device 30 is equipped with a cathode 32 connected to a high voltage-direct current source 31 and a substrate-holder 34 connected to an RF bias power source 33. A target 35 is located on the cathode 32 and a substrate 11 is located on the substrate-holder 34. A vacuum pump (not shown) is provided to suck through one of the openings 36 of the chamber to attain a vacuum, while Ar gas is admitted through the other opening 37.

The target 35 used was a hot pressed one 4 inches in diameter and 4 mm thick, consisting of 10.5 wt % of Si, 5.5 wt % of Al and balance of Fe. The substrate 11 was mirror finished on both surfaces and to obtain the size of 0.5×20×20 mm. On the mirror finished surfaces a magnetic alloy layer of Fe-Si-Al alloy (Sendust layer) was formed by the sputtering method. The argon pressure was $4\times10^{-3}$ Torr, and the power input was 500 W. The thickness of magnetic alloy layers 12 (FIG. 2) of Fe-Si-Al alloy formed on the substrate 11 was 4 μm.

On each of these magnetic alloy layer 12 an intermediate insulating layer 13 was subsequently formed. For the production of intermediate insulating layers the magnetron sputtering apparatus was used. This was also used for the production of magnetic alloy layers of Fe-Si-Al alloy and to which the RF bias was applied. The $SiO_2$ target used was 4 inches in diameter and 5 mm thick. The Ar pressure was $4\times10^{-3}$ Torr. The power input was 300 W. The thickness of $SiO_2$ formed on the magnetic alloy layers of substrate was 0.3 μm. On this intermediate insulating layer 13, the formation of magnetic alloy layers and intermediate insulating layers were repeated four times by the above described method to obtain the magnetic layer structure 14.

The total thickness of the magnetic layer structure was 20 μm. The soft magnetic layers formed as above were then heat-treated.

Further, a glass film 15 was formed on the magnetic layer structure (14) by ordinary sputtering. For the glass film (15) was used glass which was composed of $SiO_2$ (50 wt %)-$Na_2O$ (20 wt %)-$Al_2O_3$ (10 wt %)-BaO, $K_2O$, CaO and the like (balance). The 1 μm thick glass film was produced by sputtering under the condition of: Ar gas pressure—$4\times10^{-3}$ Torr; RF power input—100 W; and a substrate temperature—100° C. A number of cut chips were piled on each other to produce a laminate layer-structure 17. The substrate 16, whose material was the same as that of the substrate 11, was laminated on the glass film 15 to produce a laminate layer-structure.

Production of magnetic heads was subsequently carried out as described with reference to FIG. 1 in Description of Related Arts. Incidentally, the molding glass composed of $SiO_2$ (38 wt %) —$B_2O_3$ (20 wt %)—$Na_2O$ (22 wt %)—$K_2O$, $Li_2O$ and the like (balance) was used.

Fifty magnetic heads were produced for each of the examples by the method as described above. Failure due to crack generation at the glass-molded part occurred on only eight heads. Yield was hence 84%.

Core material of the magnetic heads had excellent properties. That is, the coercive force was 0.18 Oe, and the relative initial permeability at 1 MHz was 2000.

The inventive magnetic heads were used as VTR heads with a 20 μm track width, which corresponded to the thickness of the layers. Regenerative output was measured at 5 MHz with a relative head-tape speed of 5.8 m/sec using a metal tape. The characteristics obtained were approximately the same as those of magnetic heads in which conventional substrates, glass film and molding glass were used.

Regarding the inventive magnetic heads, no cracks generated in the glass molded parts during the production process, and no cracks generated in the glass molded part in the proximity of magnetic gap during long-term use.

The characteristics of magnetic heads are shown in detail in Table 2.

TABLE 2

| | |
|---|---|
| Track Width | 20 μm ± 1 μm |
| Gap Width | 0.25 μm ± 0.03 μm |
| Gap Depth | 20-25 μm |
| Inductance at 5 MHz | 1.35 μH ± 10% |
| Regenerative Voltage at 2 MHz | >0.5 $mV_{p-p}$ (peak to peak) |
| Regenerative Voltage at 5 MHz | >0.25 $mV_{p-p}$ |
| C/N ratio at 5 MHz | >56 dB |

Remarks: Data of 50 magnetic heads

EXAMPLE 10

The $Co_xNi_{2-x}O_2$ oxides as given in Table 3 were prepared by using NiO and CoO. Blending and crushing were carried out for 22 hours by means of a wet ball-mill with the use of ethanol. After drying, calcination was carried out at 1000° C. in Ar atmosphere. The calcined body was crushed, the CIP shaped and sintered at 1350° C. in the $N_2$ atmosphere. X ray diffraction of the resultant material revealed that its structure was rock salt type. The coefficients of thermal expansion, and hardness of the material are shown in Table 3. For comparison, the properties of conventional barium titanate are also shown in Table 3.

TABLE 3

| x | Coefficient of Thermal Expansion ($\times 10^{-7}$/°C.) | Vickers Hardness |
|---|---|---|
| 0.5 | 146 | 570 |
| 1.2 | 137 | 570 |
| 1.5 | 133 | 570 |
| Conventional | 95 | 900 |

EXAMPLE 11

CoO and NiO as the starting materials were adjusted and blended to provide a $CoNiO_2$ composition. This was calcined at 1000° C. in Ar atmosphere and then crushed for 22 hours in ethanol by a wet ball mill. MnO was added to this crushed powder at the proportions given in Table 4, and blending was then carried out. After CIP shaping, sintering was carried out in $N_2$ atmosphere at 1350° C.

The coefficient of thermal expansion, hardness and density of the sintered bodies are shown in Table 4. For purposes of comparison, the properties of a sintered body without additives are shown.

TABLE 4

| MnO addition (%) | Coefficient of Thermal Expansion ($\times 10^{-7}$/°C.) | Vickers Hardness | Density (%) |
|---|---|---|---|
| 0 | 135 | 570 | 96.3 |
| 0.1 | 139 | 600 | 97.5 |
| 0.3 | 139 | 620 | 97.5 |
| 1 | 139 | 620 | 98.0 |
| 2 | 138 | 620 | 98.0 |
| 5 | 136 | 620 | 98.0 |
| 10 | 126 | 560 | 97.5 |

EXAMPLE 12

The same methods as in Example 11 were carried out to produce compositions with $TiO_2$ additive. The results are shown in Table 5. The properties of a sintered body without additives are shown in Table 5 as a comparative example.

TABLE 5

| TiO₂ addition (%) | Coefficient of Thermal Expansion ($\times 10^{-7}$/°C.) | Vickers Hardness | Density (%) |
| --- | --- | --- | --- |
| 0 | 136 | 570 | 96.3 |
| 0.1 | 131 | 600 | 97.2 |
| 0.3 | 128 | 610 | 97.5 |
| 1 | 126 | 620 | 98.5 |
| 2 | 120 | 630 | 98.0 |
| 5 | 112 | 680 | 97.5 |
| 10 | — | 700 | 96.0 |

EXAMPLE 13

The same methods as in Example 11 were carried out to produce compositions with $Al_2O_3$ additive. The results are shown in Table 6. The properties of a sintered body without additives are shown in Table 6 as a comparative example.

TABLE 6

| Al₂O₃ addition (%) | Coefficient of Thermal Expansion ($\times 10^{-7}$/°C.) | Vickers Hardness | Density (%) |
| --- | --- | --- | --- |
| 0 | 136 | 570 | 96.3 |
| 0.1 | 134 | 575 | 96.4 |
| 0.3 | 132 | 578 | 96.7 |
| 1 | 125 | 582 | 97.5 |
| 2 | 125 | 590 | 98.2 |
| 5 | 121 | 620 | 98.2 |
| 10 | 114 | 740 | 97.6 |

EXAMPLE 14

The same methods as in Example 11 were carried out to produce compositions with CaO additive. The results are shown in Table 7. The properties of a sintered body without additive are shown in Table 7 as a comparative example.

TABLE 7

| CaO addition (%) | Coefficient of Thermal Expansion ($\times 10^{-7}$/°C.) | Vickers Hardness | Density (%) |
| --- | --- | --- | --- |
| 0 | 136 | 570 | 96.3 |
| 0.1 | 135 | 600 | 98.0 |
| 0.3 | 133 | 600 | 98.0 |
| 1 | 130 | 620 | 97.6 |
| 2 | 129 | 680 | 98.0 |
| 5 | 127 | 750 | 99.0 |
| 10 | 124 | 880 | 99.5 |

EXAMPLE 15

The process of this Example is illustrated in FIG. 5. Commercially available CoO and NiO were weighed to provide the $CoNiO_2$ composition and then blended. An alumina ball mill was used for blending. Blending together with 1 l of ethanol was carried out for 20 hours. By means of using ethanol, the contamination by $Al_2O_3$ could be reduced as compared with the case of using pure water. After withdrawal, drying and then screening with a 250 μm screen were carried out.

The obtained powder mixture was CIP shaped for 3 minutes under a pressure of 1500 kg/cm². The CIP shaped body was calcined at 900° C. for 5 hours in the $N_2$ atmosphere, followed by furnace-cooling. The calcined body was roughly crushed by means of a vibration mill and then screened by a 150 μm screen, thereby obtaining calcined powder. The resultant calcined powder was finely milled by a ball mill as follows: first, 20 hours with the use of balls 10 to 20 mm in diameter and together with 1 l of ethanol and; then, 40 hours with balls 2 to 5 mm in deameter, which replaced the larger ones. The average particle size of the resultant powder was approximately 0.7 μm.

The resultant calcined powder was dried. Pure water was added to the resultant calcined powder to render it in a slurry state. Granulation by a spray drier was then carried out to obtain spherical particles approximately 50 μm in size. Screening with a 60 μm screen was carried out to adjust the grain size. A 60 mm high shaped body was then produced by means of CIP using a die 55 mm in diameter. The CIP conditions were 1500 kg/cm² and 3 minutes. The CIP shaped body was machined to remove the surface unevenness. A powder identical to that of this shaped body was packed outside this shaped body until a thickness of approximately 3 mm was obtained. The packed powder and the preliminarily CIP shaped body was again CIP shaped under the same condition as the preliminary shaping.

The dually twice CIP shaped body was sintered at 1280° C. for 3 hours in $O_2$ atmosphere. The sintering atmosphere was changed from $N_2$ to $O_2$ and vice versa at a temperature rise to and a temperature fall down to 1000° C. Temperature elevating rates were 5° C./min up to 680° C., 1° C./min at 680°-1000° C., and 0.8° C./min at 1000° C. or more. The temperature lowering rate was 1° C./min. A sintered body having relative density of 97% was obtained as a result of the sintering. Cracks stopped in the outer peripheral part of the dual CIP shaped body and did not intrude further into the inner part.

The shaped body was subjected to HIP treatment without encapsulation. The treatment was carried out at 1200° C., 1000 kg/cm², and for 1 hour. The HIP treated body was sliced and polished to obtain a non-magnetic substrate. Its properties are shown in Table 8. The properties of a commercially available MnO-NiO series substrate are also shown in Table 8, as a reference example.

TABLE 8

| | Example | Reference Example |
| --- | --- | --- |
| Relative Density (%) | 97.0 | 98.0 |
| Vickers Hardness (*) | 650 | 630 |
| Bending Strength (kg/mm²) | 22 | 27 |
| Coefficient of Thermal Expansion ($\times 10^{-7}$°C.) | 136 | 134 |
| Surface Roughness (nm) (#) | 26.8 | 51.5 |

Remarks:
(*) load 100 g
(#) P-V value

The relative density, hardness, bending strength, and coefficient of thermal expansion of the material according to the reference example are of virtually the same level as those of the inventive example. Surface roughness of the former is however greater than of the latter.

The surface of the material of the reference example was observed by EPMA. Many Ni rich phases were detected in addition to the phases of rock-salt structure. Presumably, the Ni-rich phases were ground out of the material during polishing, thereby increasing the surface roughness in the case of the reference example.

We claim:

1. A method for forming a non-magnetic substrate for vapor-depositing, comprising the steps of: blending and then screening starting materials having a composition selected from the group consisting of (A) $Zn_xM_yCo_{2-x-}$ $_y$O$_2$, wherein M is selected from the group consisting of Mn, $0 \leq x \leq 0.4$, $0.4 \leq y \leq 1.0$, $0.8 \leq x+y \leq 1.0$, and (B) Co$_x$Ni$_{2-x}$O$_2$, wherein $0.2 \leq x \leq 1.8$; CIP shaping the blended and, screened starting materials to form a CIP shaped body; calcining the CIP shaped body crushing and then screening the calcined body to form calcined powder; to form a calcined body, finely milling the calcined powder to 1 μm or less to form finely milled powder; granulating the finely milled powder to a spherical shape 20 μm or more in size to form granulated powder; shaping the granulated powder by CIP to form shaped powder; sintering the CIP shaped powder at a sintering temperature to form a sintered body; and HIP treating the sintered body.

2. A method according to in claim 1, wherein said sintering step is carried out at a temperature of 1000° C. or more in an oxygen atmosphere, under normal pressure or high pressure of a hot press method.

3. A method according to in claim 1, wherein said HIP step is carried out, without encapsulating the sintered body, at a temperature lower than the sintering temperature.

4. A method according to claim 2, wherein N$_2$ atmosphere is used at a temperature lower than 1000° C. during temperature rise to and temperature-fall from the sintering temperature.

* * * * *